Patented June 30, 1925.

1,544,201

UNITED STATES PATENT OFFICE.

CHARLES B. WATERS, OF MONTCLAIR, NEW JERSEY.

WELDING PROCESS.

No Drawing.　　　Application filed August 16, 1924. Serial No. 732,577.

*To all whom it may concern:*

Be it known that I, CHARLES B. WATERS, a citizen of the United States, residing at Montclair, in the county of Essex and State of New Jersey, have invented certain new and useful Improvements in Welding Processes, of which the following is a specification.

The present invention relates to improvements in welding processes.

More particularly the invention relates to an improved process for rapidly joining metal strips and pieces in a manner to make a flush welded joint in an economical manner. The invention is especially useful in the manufacture of metallic window frames and all frame works built up of metal strips. Efforts to spot weld such frame work have been unsuccessful because a raised unsightly joint is produced. At present the practice is to abut the pieces and join them by depositing metal with a metallic arc. The excess metal deposited is ground off to leave the joints flush. This process is slow and expensive. The increase in demand for metallic frame work has been such that large sums of money have been spent to develop more economical and satisfactory methods of manufacture without success.

By my improved method a modified and improved close grained flush spot weld may be rapidly and economically produced.

As ordinarily carried out, pieces to be spot welded are pressed together between electrodes of relatively small area and heavy currents are passed through the pieces to be welded between the electrodes resulting in a union of the metals in a substantial spot the size of the electrodes. If an effort is made to press the pieces into a flush weld, the electrodes simply soften and will melt down.

In my improved process the pieces to be welded are placed in contact and are then pressed together in the manner of ordinary spot welding, but electrodes of larger area and heavier currents than are used in spot welding are utilized so that in addition to effecting a union of the material, a substantial section on the metal pieces surrounding the spot weld are brought to a forging heat. As soon as a forging heat is reached the pressure is removed. The pieces are now securely joined together and are at a white or forging heat. The operator then immediately forges the welded pieces by beating until the parts are flush. The forging makes a close grained exceptional strong and serviceable flush joint free of nitrides such as usually occur in arc welds, and over which enameling may be successfully carried out.

The size of the electrodes and currents utilized will vary with the size of the pieces being welded but are larger than necessary to effect a spot weld of the pieces so that the joint and surrounding parts immediately come to a forging heat. I prefer to utilize a lower electrode of a material which may be used as an anvil after the weld is effected, and to affect the heating rapidly without injury to the electrodes, the electrodes are preferably water cooled. Although the forging may be carried out by hand I prefer to use a conveniently arranged air forging hammer.

Various combinations of combined welding and forging electrodes with automatic hammer arrangements may be provided. A particularly effective arrangement for small work is to provide a phosphor bronze lower electrode which will serve as an anvil. The combination anvil and electrode is mounted upon a sliding table arranged to carry the work. In one position the work is directly beneath the other welding electrode which is arranged to be pressed against the work to effect the weld and to heat the weld to forging heat. The table is then shifted to bring the work under an air hammer which is immediately operated to forge the joint flush. For different types of work the work alone may be shifted from fixed welding and heating electrodes to the air hammer, and for other types of welding, the work may remain stationary and the upper electrode and hammer may be movable to be positioned over the work at the proper times. The mechanical means utilized all, however, carry out my process.

The manner of altering the well known spot welding and arrangements to carry out my process by enlarging electrodes and increasing currents will be obvious to those skilled in the art. It will be understood that the usual alternating heating currents are preferably utilized.

Having described preferred embodiments of the invention what is claimed as new and desired to be secured by Letters Patent is:

1. The process of forming a close grained flush welded joint between two metallic strips which comprises placing the strips to be welded in overlapping contact between a pair of electrodes; passing a sufficiently heavy current between said electrodes through said pieces over their entire area of contact with each other and through adjacent portions of the pieces only in contact with the electrodes to bring the overlapping parts to a forging heat and simultaneously pressing the electrodes together with sufficient pressure to effect a lap weld between the pieces; and then immediately forging the heated lap welded pieces into a flush surfaced joint.

2. The process as set forth in claim 1 in which one of said electrodes is utilized as an anvil for forging said pieces.

In testimony whereof, I affix my signature.

CHARLES B. WATERS.